United States Patent [19]

Zaehring et al.

[11] Patent Number: 4,808,073
[45] Date of Patent: Feb. 28, 1989

[54] METHOD AND APPARATUS FOR COOLING A HIGH PRESSURE COMPRESSOR OF A GAS TURBINE ENGINE

[75] Inventors: Gerhard Zaehring, Woerthsee; Josef Wohlmuth, Puchheim Bhf; Hans-Juergen Schmuhl, Woerthsee, all of Fed. Rep. of Germany

[73] Assignee: MTU Motoren- Und Turbinen- Union Munchen GmbH, Munchen, Fed. Rep. of Germany

[21] Appl. No.: 120,990

[22] Filed: Nov. 16, 1987

[30] Foreign Application Priority Data

Nov. 14, 1986 [DE] Fed. Rep. of Germany ....... 3638960

[51] Int. Cl.⁴ .............................................. F01D 5/08
[52] U.S. Cl. ...................................... 416/95; 415/175
[58] Field of Search ................... 416/95; 415/175, 176, 415/177, 180; 60/726

[56] References Cited

U.S. PATENT DOCUMENTS

| | | | |
|---|---|---|---|
| 2,750,147 | 6/1956 | Smith | 416/95 X |
| 2,858,102 | 10/1958 | Bloomberg | 416/95 X |
| 3,632,221 | 1/1972 | Uehling | 416/95 X |
| 3,647,313 | 3/1973 | Koff | 416/95 X |
| 3,742,706 | 7/1973 | Klompas | 60/726 |
| 4,657,482 | 4/1987 | Neal | 415/176 |

FOREIGN PATENT DOCUMENTS

| | | | |
|---|---|---|---|
| 978608 | 11/1950 | France | 416/95 |
| 72603 | 4/1983 | Japan | 416/95 |
| 223615 | 12/1942 | Switzerland | 416/95 |
| 225231 | 4/1943 | Switzerland | 416/95 |
| 789197 | 1/1958 | United Kingdom | 416/95 |

OTHER PUBLICATIONS

SNECMA-SCN Prospectus CFM 2074/11/84 Information Sheet.

Primary Examiner—Everette A. Powell, Jr.
Attorney, Agent, or Firm—Roberts, Spiecens & Cohen

[57] ABSTRACT

The hollow shaft of a high pressure compressor is provided in a conically tapering section downstream of the last rotor disc on its inner surface with a vane-like rib arrangement for conveying a stream of cooling air from the vicinity of the axis of the shaft into the outer peripheral regions of the last rotor disc. The stream then passes through corresponding circumferentially distributed axial holes in the rotor disc. In this way, better cooling of the last compressor stages which have been heated by the main stream of air in the compressor and a reduction in the stresses in the structural parts can be obtained.

6 Claims, 1 Drawing Sheet

METHOD AND APPARATUS FOR COOLING A HIGH PRESSURE COMPRESSOR OF A GAS TURBINE ENGINE

FIELD OF THE INVENTION

The present invention relates to a gas turbine jet engine having a high pressure compressor, the rotor of the engine being constructed substantially as a hollow shaft having a conically tapering section behind the last rotor disc of the high pressure compressor. The engine also includes means for cooling the high pressure compressor by supplying air from a low pressure compressor.

PRIOR ART

In SNECMA-SCN Prospectus CFM 2074/11/84, there is shown a gas turbine jet engine whose high pressure compressor is cooled by a stream of air which is diverted from a low pressure compressor and is conducted within the space between the discs of the high pressure compressor and the turbine shaft for cooling a downstream chamber which leads to the turbine. However, the cooling action is insignificant for the radially outer regions of the discs of the compressor. As a result excessive stresses are developed, particularly in the discs of the last stages of the compressor in modern high pressure compression engines due to large radial temperature gradients. The temperature gradients and the resulting stresses are produced by the circulation at the outer periphery of the discs by the hot air in the main stream in the compressor and on the inner periphery by the cooling air.

As a result of the stresses produced thereby, and by centrifugal forces, the compressor discs are highly stressed whereby the last stages of the high pressure compressor are made of heat resistant nickel alloys. However, this has the disadvantage that the compressor becomes high in weight as a result of the large density of the nickel alloys.

SUMMARY OF THE INVENTION

An object of the present invention is to provide a method and means which make it possible to also cool the outer regions of the highly thermally stressed compressor parts so that their thermal stresses are reduced and the parts can be made of light weight metals.

This object is achieved in accordance with the invention by a combination of the following features:

(a) on the inner side of a conically tapering section, the hollow shaft is provided with vane-like ribs for conveying, by impelling, incoming cooling air in a reverse direction back towards the last disc of the compressor in the direction of widening of the conically tapering section (b) the last rotor disc is provided near its outer peripheral edge with circumferentially spaced holes located in the path of the reversed cooling air flowing radially outwardly.

The vane-like ribs, as a result of the rotation of the hollow shaft, convey a part of the cooling air arriving in the vicinity of the axis of the shaft to the radially outer region of the last rotor disc where the air passes through the holes into a hollow space between the last disc and the next adjacent rotor disc.

In the hollow space, the stream of cooling air travels radially inwards and combines with fresh cooling air coming from the low pressure compressor and thus forms a circulating flow path. In this way a considerably improved cooling of the hollow shaft and the rearmost rotor disc is obtained, as a result of which the use of a light metal, such as titanium, is possible for these parts. Due to the saving in weight which can be obtained, in this way, various advantages are obtained, such as reduction of forces and moments of inertia and consequent saving of fuel.

The ribs which serve for the conveying of the cooling air furthermore advantageously enlarge the surface of the hollow shaft and thus improve the removal of heat therefrom.

The vane-like ribs are preferably curved in the circumferential direction in order to increase the conveying effect, so that the air can flow with sufficient pressure through the holes in the rearmost rotor disc.

In another embodiment, the holes can be at an angle in the circumferential direction with respect to the axis of the rotor disc to achieve a better conveying action.

BRIEF DESCRIPTION OF THE VIEWS OF THE DRAWING

One embodiment of the invention will be described in detail with reference to the appended drawing, in which.

DETAILED DESCRIPTION OF A PREFERRED EMBODIMENT

Figure 1:
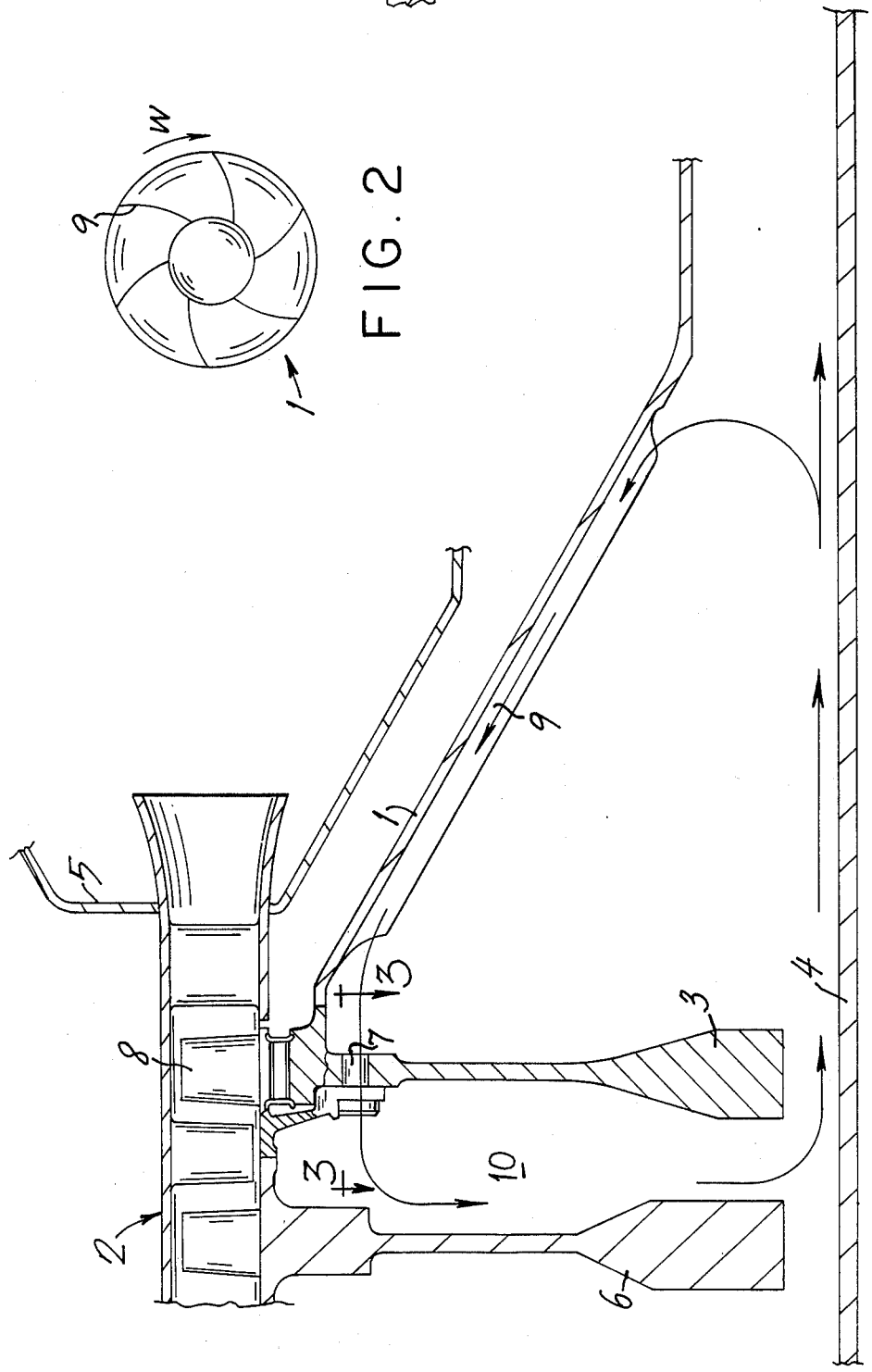
FIG. 1 is an axial section through the rear part of a high pressure compressor and of a conically tapering section of the adjoining hollow shaft.

FIG. 1 shows a hollow shaft 1 fastened to the last rotor disc 3 of a high pressure compressor 2. Downstream, the hollow shaft 1 is connected to the rotor of a high pressure turbine (not shown). A shaft 4, which couples a low pressure compressor (also not shown) to a low pressure turbine (not shown), extends radially inwards of the shaft 4 and the rotor discs of the compressor. Downstream of the vanes 8 on the periphery of the rearmost rotor disc 3 there is arranged an inner casing 5 of a combustion chamber (not shown).

Figure 2:
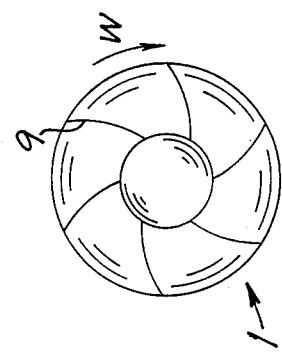
FIG. 2 is a diagrammatic end view of the conically tapering section of the shaft with its internal ribs.

The conically tapering section of the hollow shaft 1 is provided on the inner surface thereof with a plurality of vane-like ribs 9 distributed over the circumference of the shaft. The ribs 9, as diagrammatically shown in FIG. 2, are curved in the circumferential direction. The rotor disc 3 is provided in its radially outer region near the outer periphery thereof and in the vicinity of its attachment to the rotor shaft, with circumferentially distributed axial holes 7.

Cooling air which is tapped off from the low pressure compressor (not shown) flows in the vicinity of the shaft 4 downstream of the high pressure compressor 2 and arrives in the field of action of the ribs 9. Due to the rotation of the hollow shaft 1 and ribs 9, the cooling air is impelled and conveyed, similar to the principle of action of a radial compressor, radially outward along the inner surface of the hollow shaft 1.

The cooling air passes through the holes 7 in the rotor disc 3 into a hollow space 10 between the last rotor disc 3 and the next adjacent rotor disc 6. The cooling air flows radially inwards in the hollow space and cools the two discs. The cooling air then mixes with fresh cooling air coming from the low pressure compressor so that a circulating stream of air results. A part of the air passes again in reverse direction into the resultant circulating circuit while the other part flows axially onwards in the direction towards a chamber of the turbine (not shown).

Figure 3:
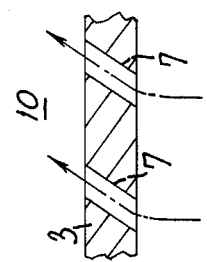
FIG. 3 is a sectional view taken along line 3-3 in FIG. 1 and shows a portion of the last rotor disc at which the holes therethrough are modified.

In FIG. 3, the holes 7' in the last rotor disc 3 are inclined at an angle with respect to the axis of the disc in the circumferential direction to enhance the conveying action.

The ribs 9 are generally of uniform height along the length of the hollow shaft 1.

What is claimed is:

1. A gas turbine jet engine comprising a high pressure compressor including a rotor comprising a hollow shaft and a plurality of spaced rotor discs rotatable with the rotor, said hollow shaft including a conically tapering section behind the last of the rotor discs of the high pressure compressor, means for cooling the high pressure compressor by the supply of cooling air from a low pressure compressor, characterized as follows:
    (a) a plurality of vane-like ribs on said conically tapering section on an inner surface thereof for conveying the cooling air along said conically tapering section in the direction of widening thereof towards the last of the rotor discs,
    (b) said last rotor disc being provided near the outer periphery thereof with a plurality of circumferentially spaced holes for flow of the cooling air therethrough.

2. A gas turbine jet engine as claimed in claim 1, wherein said ribs are curved in the circumferential direction.

3. A gas turbine jet engine as claimed in claim 1 wherein said holes are inclined at an angle with respect to the axis of the rotor disc.

4. A gas turbine engine as claimed in claim 1 wherein said ribs have a substantially uniform depth along their length.

5. A method of cooling the downstream rotor discs of a rotor of a high pressure compressor comprising supplying cooling air to a high pressure compressor in a direction headed downstream of successive rotor discs of the compressor, reversing the direction of flow of a portion of the cooling air leaving the compressor so that the reversal portion flows upstream towards the last rotor disc of the compressor, impelling the reversed portion of the cooling air to flow radially outwards with rotation towards the periphery of the last rotor disc, and conveying the flowing cooling air through holes formed in said last rotor disc along a circulating path between the last rotor disc and the next rotor disc adjacent thereto to combine with fresh cooling air supplied to the compressor.

6. A method as claimed in claim 5 wherein said reversed portion of the cooling air is impelled in its flow by ribs formed on the inner surface of a conically tapered portion of a rotor extending downstream of the last rotor disc.

* * * * *